(12) United States Patent
Murakami et al.

(10) Patent No.: US 8,931,507 B2
(45) Date of Patent: Jan. 13, 2015

(54) MULTIPLE MANIFOLD VALVE

(75) Inventors: Takashi Murakami, Tsukubamirai (JP); Shinji Miyazoe, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 215 days.

(21) Appl. No.: 13/180,848

(22) Filed: Jul. 12, 2011

(65) Prior Publication Data

US 2012/0025116 A1 Feb. 2, 2012

(30) Foreign Application Priority Data

Jul. 30, 2010 (JP) .................................. 2010-171762

(51) Int. Cl.
*F16K 27/12* (2006.01)
*F16K 27/00* (2006.01)
*F15B 13/08* (2006.01)

(52) U.S. Cl.
CPC ........... *F16K 27/003* (2013.01); *F15B 13/0814* (2013.01); *F15B 13/0839* (2013.01); *F16K 27/12* (2013.01)
USPC .......................................... 137/382; 137/884

(58) Field of Classification Search
USPC ...................................... 137/884, 381–382.5
See application file for complete search history.

(56) References Cited

U.S. PATENT DOCUMENTS

| | | | | |
|---|---|---|---|---|
| 4,515,184 A | * | 5/1985 | Bownass et al. | ......... 137/625.66 |
| 5,022,717 A | * | 6/1991 | Heibel et al. | ................ 303/119.3 |
| 5,640,995 A | * | 6/1997 | Packard et al. | ................ 137/597 |
| 5,887,623 A | | 3/1999 | Nagai et al. | |
| 5,996,629 A | * | 12/1999 | Sato et al. | ................ 137/625.64 |
| 6,220,300 B1 | * | 4/2001 | Schudt et al. | ................ 137/884 |
| 6,874,537 B2 | * | 4/2005 | Hayashi et al. | ................ 137/884 |
| 7,242,552 B2 | * | 7/2007 | Kudo et al. | ................ 360/97.12 |
| 7,438,088 B2 | | 10/2008 | Matsumoto et al. | |
| 7,442,464 B2 | * | 10/2008 | Li | ................................. 429/97 |
| 2004/0228072 A1 | * | 11/2004 | Chen et al. | .................... 361/600 |

FOREIGN PATENT DOCUMENTS

| | | |
|---|---|---|
| DE | 195 19 888 A1 | 12/1996 |
| DE | 19519888 A1 * | 12/1996 |
| DE | 692 33 543 T2 | 6/2006 |
| EP | 0373551 A2 * | 6/1990 |

(Continued)

OTHER PUBLICATIONS

Office Action issued Mar. 23, 2012 in Sweden Patent Application No. 1150666-4 (with English translation).

(Continued)

*Primary Examiner* — John Fox
*Assistant Examiner* — Seth W Mackay-Smith
(74) *Attorney, Agent, or Firm* — Oblon, Spivak, McClelland, Maier & Neustadt, L.L.P.

(57) ABSTRACT

A plurality of electromagnetic valves are mounted on a manifold base, a single top cover that covers the plurality of electromagnetic valves as a whole is mounted, the top cover is screwed into the manifold base in a state in which a positioning pin on a lower end of a peripheral wall is fitted into a small hole in the manifold base, a reinforcing rib is formed on an inner face of a top plate of the top cover, the rib is arranged so that the rib is brought into contact with the upper faces of the electromagnetic valves all the time or is brought into contact with the electromagnetic valves when the top cover is elastically deformed by a pressing force from the outside acting on the top cover.

13 Claims, 4 Drawing Sheets

(56) References Cited

FOREIGN PATENT DOCUMENTS

| JP | 10-47521 A | 2/1998 |
| JP | 11-511413 A | 10/1999 |
| JP | 2002-295272 A | 10/2002 |
| JP | 2004-11858 A | 1/2004 |
| JP | 2007-170669 A | 7/2007 |
| JP | 2008-215400 A | 9/2008 |

OTHER PUBLICATIONS

German Office Action issued Aug. 16, 2012 in Patent Application No. 10 2011 108 746.3.

Japanese Office Action issued Nov. 13, 2012 in Patent Application No. 2010-171762 with English Translation.

* cited by examiner

MULTIPLE MANIFOLD VALVE

BACKGROUND OF THE INVENTION

[1] Field of the Invention

The present invention relates to a multiple manifold valve in which a plurality of valves are mounted on an integral-type manifold base in an airtight manner and particularly to a multiple manifold valve suitable for use in food-related processors which need to maintain good hygiene.

[2] Description of the Related Art

Hitherto, as multiple manifold valves used in food-related processors which need to maintain good hygiene, a multiple manifold valve has been known in which a plurality of valves are mounted on an integral-type manifold base, and each valve is individually covered by a top cover and constituted in an airtight manner so as to withstand washing by high-temperature and high-pressure steam jet or the like. In this type of manifold valves, due to the necessity of washing after use, the top cover capable of withstanding washing is individually provided to cover each valve on the manifold base, but not only that it is disadvantageous in light of a manufacturing cost but also in order to suppress collection of sewage, water and the like in a space between the adjacent top covers, a certain gap needs to be ensured between the adjacent top covers, which obstructs size reduction of the entire manifold valve.

In order to solve such problems, the top covers which cover the multiple valves can be formed as a single top cover so that the single top cover can cover all the plurality of valves arranged close to each other in an airtight manner, but since the cover needs to be formed by a transparent or translucent synthetic resin or the like so that a flashing state of an operation indicator lamp of each valve contained therein should be able to be visually checked, if the top cover is formed having a large size so that the top cover can cover the entire multiple valves by the synthetic resin, which is not sufficiently strong, the strength should be reinforced by various means such as an increase in the thickness so as to add strength that can withstand washing by high-temperature and high-pressure steam jet and other various considerations to the configuration of the top cover, and in the end, even if the top cover which covers the multiple valves is made into a single one, though it is effective for the size reduction of the manifold valve, it is doubtful how much the manufacturing cost can be improved.

BRIEF SUMMARY OF THE INVENTION

A technical object of the present invention is to provide a multiple manifold valve whose reinforcement effect is improved by using a single top cover that can cover the entire multiple valves without giving the top cover itself sufficient strength that withstands washing by high-temperature and high-pressure steam jet by allowing the multiple valves to compensate for a part of the strength.

In order to achieve the above object, according to the present invention, a multiple manifold valve formed by mounting multiple valves on a manifold base and by wrapping the multiple valves with the top cover in a sealed state is provided.

The multiple valves are formed by a plurality of electromagnetic valves, and the top cover is an integral-type cover that covers the entire multiple valves mounted on the manifold base and is formed by a transparent or translucent synthetic resin, a plurality of positioning pins are formed on the lower ends of peripheral walls of the top cover in a discrete state, the top cover is positioned by inserting the positioning pins into each of small holes in the manifold base, the top cover is screwed into the manifold base at a plurality of spots including at least the four corners in that state, a reinforcing rib is formed on an inner face of a top plate of the top cover, and the rib is brought into contact with the upper faces of the electromagnetic valves mounted on the manifold base or is arranged above the electromagnetic valves in a state in which such a positional relationship is maintained that the rib is brought into contact with the electromagnetic valves within a range where the top cover is elastically deformed by a pressing force from the outside acting on the top cover.

In the present invention, the ribs are preferably disposed at positions in contact with two of the adjacent electromagnetic valves astride.

In this case, it is preferable that only one rib is brought into contact with one electromagnetic valve by arranging the ribs at every other adjacent part of the adjacent electromagnetic valves.

Also, in the present invention, it may be so configured that on an end face on an electromagnetic operation portion side of each of the electromagnetic valves mounted on the manifold base and/or on an end face on the opposite side, a reinforcing portion is formed which reinforces the peripheral wall of the top cover from inside against the inner face of the peripheral wall, a reinforcing peripheral wall rib is formed on a portion opposite the reinforcing portion of the peripheral wall, and the peripheral wall rib is formed in contact with the reinforcing portion of the electromagnetic valve or opposite the reinforcing portion while maintaining such a positional relationship of being brought into contact with the reinforcing portion of the electromagnetic valve within a range in which the top cover is elastically deformed by a pressing force from the outside acting on the top cover.

The peripheral wall ribs are preferably disposed at positions in contact with two of the adjacent electromagnetic valves astride.

In this case, it is desirable that only one peripheral wall rib is brought into contact with one electromagnetic valve by arranging the peripheral wall ribs at every other adjacent part of the adjacent electromagnetic valves.

Also, it may be so configured that each of the peripheral wall ribs has a U-shaped section and two projecting rims, and the two projecting rims are individually brought into contact with one and the other of the adjacent electromagnetic valves.

In the present invention, it may be so configured that the multiple valves mounted on the manifold base are divided into plural groups, the electromagnetic valves are closely arranged in parallel in each of the groups, a gap into which a reinforcing wall can intervene is formed between the groups, and the reinforcing wall which intervenes into the gap between the groups and is brought into contact with the manifold base is integrally provided on the inner face of the top cover.

In this case, it is desirable that the reinforcing wall is formed so as to extend across the inside of the top cover from one to the other of a pair of opposing peripheral walls, a positioning pin is formed on the lower end of the reinforcing wall, and by inserting the positioning pin into a small hole in the manifold base, the reinforcing wall is fixed onto the manifold base.

In the multiple manifold valve of the present invention having the above configuration, even if a pressing force for washing caused by high-temperature and high-pressure steam jet or the like acts on the top cover, the reinforcing ribs projected on the inner face of the top plate of the top cover are brought into contact with the upper faces of the electromagnetic valves mounted on the manifold base or the peripheral wall rib provided on the inner face of the peripheral wall of the top cover is in contact with the reinforcing portion of each of the electromagnetic valves in advance, or even if they are not in contact, they are brought into contact with the electromagnetic valves within a range of elastic deformation by the pressing force from the outside onto the top cover, and the strength of the top cover itself does not have to have sufficient strength to withstand an external force by the high-temperature and high-pressure steam jet or the like. Moreover, dimensional accuracy of positions between the electromagnetic valves and the ribs on the inner face on the upper part of the top cover and the peripheral wall rib does not have to be particularly high.

According to the manifold valve of the present invention described above in detail, while the single top cover is used to cover the entire multiple valves mounted on the manifold base, the multiple valves can bear a part of the strength without giving sufficient strength to withstand washing by high-temperature and high-pressure steam jet or the like to the top cover itself, and thus, a manifold valve having multiple valves mounted used in food-related processors requiring good hygiene can be provided with a simple structure and a low cost.

DETAILED DESCRIPTION OF THE INVENTION

Figure 1:
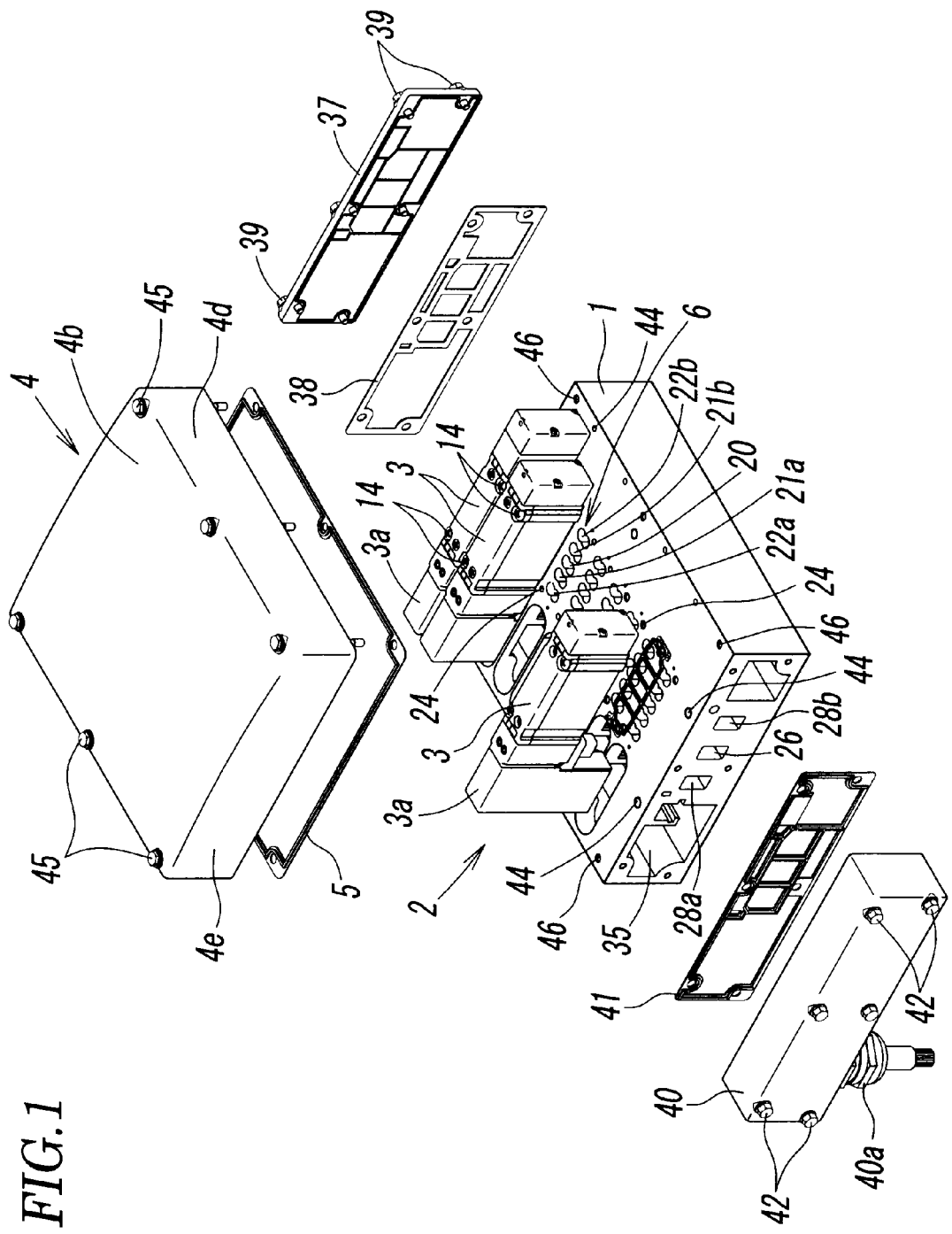
FIG. 1 is an exploded perspective view of a multiple manifold valve according to the present invention in an embodiment without some of electromagnetic valves.

FIGS. 1 to 5 illustrate an embodiment of a multiple manifold valve according to the present invention. This manifold valve has a multiple valve 2 formed by mounting a plurality of electromagnetic valves 3 on an integral-type manifold base 1 in a parallel state in an outline configuration and by covering the entire multiple valve 2 with a single top cover 4 made of a transparent or translucent light-permissive synthetic resin in a state air-tightly sealed by a seal member 5. The manifold base 1 has a rectangular shape when viewed on plan.

Figure 4:
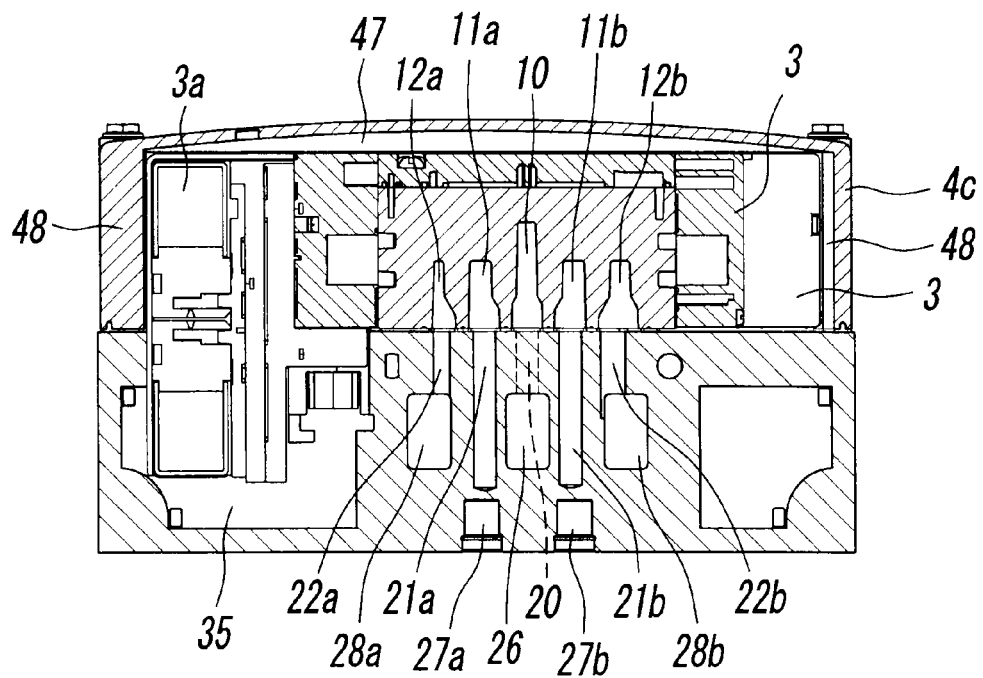
FIG. 4 is a longitudinal sectional view at IV-IV position in FIG. 3.

Each of the electromagnetic valves 3 mounted on the manifold base 1 is mainly formed by a switching valve of a known pilot-driven 3-5 port, but since a 5-port switching valve is used in the illustrated example, in a mounting portion 6 of each of the electromagnetic valves 3 on the upper face of the manifold base 1, as known from FIG. 1 and FIG. 4, a central supply channel 20 communicating with a supply port 10 of the electromagnetic valve 3, output channels 21a and 21b located on both sides of the supply channel 20 and communicating with a pair of output ports 11a and 11b of the electromagnetic valve 3, and discharge channels 22a and 22b located on both outer sides of the output channels 21a and 21b and communicating with a pair of discharge ports 12a and 12b of the electromagnetic valve 3 are opened in an aligned state and correspond to the ports of the electromagnetic valve 3. The supply channels 20, the output channels 21a and 21b, and the discharge channels 22a and 22b in all the electromagnetic-valve mounting portions 6 are disposed in a linear state in the juxtaposition direction of the electromagnetic valves 3, respectively, and form a supply channel row, an output channel row, and a discharge channel row, respectively.

All the supply channels 20, the output channels 21a and 21b, and the discharge channels 22a and 22b forming the channel rows may be disposed at a certain interval so that, when the electromagnetic valves 3 are mounted to all the mounting portions 6, all the electromagnetic valves 3 are closely disposed with no or only a slight gap formed between each other, but as in the illustrated example, the multiple valve 2 may be divided into a plurality of groups (See FIG. 3) so that, though the electromagnetic valves 3 are closely arranged in parallel in each group, a gap 7 into which a reinforcing wall 49, which will be described later, provided on the inner face of the top cover 4 intervene is formed between the groups and the distal end of the reinforcing wall 49 is brought into contact with the manifold base 1 and positioned and fixed. The fixation of the electromagnetic valve 3 onto the manifold base 1 is accomplished by screwing and inserting a fixing screw 14 which penetrates the body of the electromagnetic valve 3 into a screw hole 24 disposed in the manifold base 1.

On the other hand, inside the manifold base 1, a common supply path 26 having a certain sectional shape with which each of the supply channels 20 communicates is disposed and located below the above-described plurality of supply channels 20 aligned in one row and directed toward the alignment direction of the supply channels 20, and two common discharge paths 28a and 28b, each having a certain sectional shape with which each of the discharge channels 22a and 22b communicates, are provided in parallel with the common supply path 26 on both sides of the supply channels 20 and located below the plurality of discharge channels 22a and 22b which form two channel rows.

Figure 2:
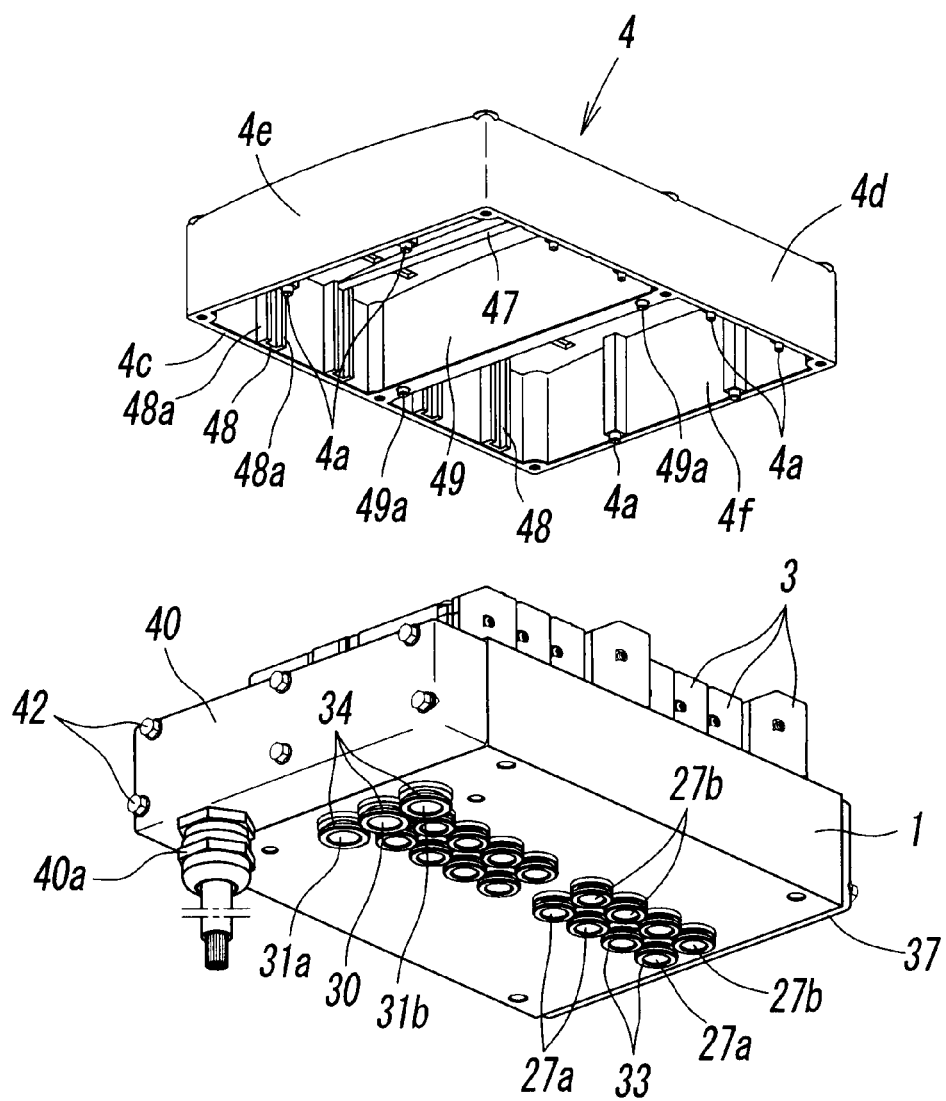
FIG. 2 is an exploded perspective view of the manifold valve seen from diagonally below.
Figure 3:
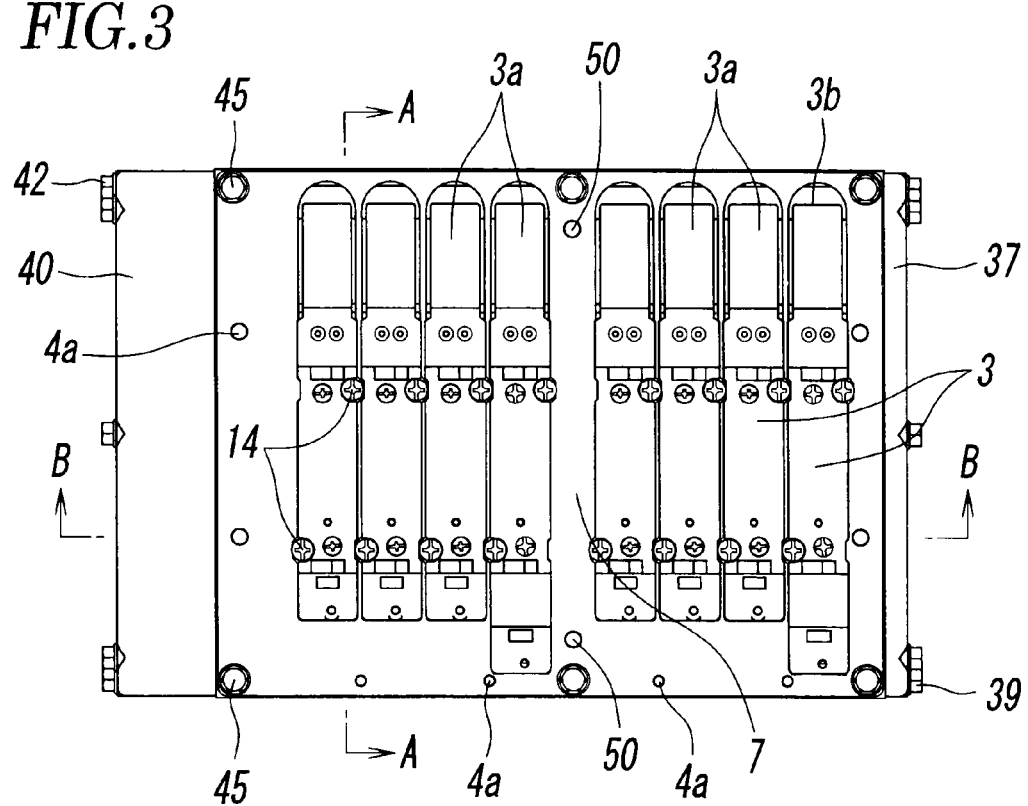
FIG. 3 is a plan view illustrating the inside seen through a transparent top cover of the manifold valve.

The output channels 21a and 21b opened in the manifold base 1 in an aligned state communicate with output ports 27a and 27b opened in the lower face of the manifold base 1 immediately below the output channels 21a and 21b and connected to required fluid-pressure driving devices by piping through a pipe joint 33 mounted to the output ports 27a and 27b as known from FIG. 2 and FIG. 4. Also, the common supply path 26 and the common discharge paths 28a and 28b communicate with a supply port 30 and a pair of discharge ports 31a and 31b opened in the lower face of the manifold base 1 at positions not conflicting with the output ports 27a and 27b and are connected to an air pressure source and a discharge end by piping through a pipe joint 34 mounted to the discharge ports 31a and 31b.

Moreover, the manifold base 1 has a through hole 35 for wiring which contains wiring (not shown) for electricity/control to be connected to the electromagnetic valves 3 at a position below an electromagnetic operation portion 3a which drives a pilot valve of each of the electromagnetic valves 3.

Similarly to the common supply path 26 and the common discharge paths 28a and 28b, the through hole 35 for wiring is constituted so as to have a certain sectional shape and to penetrate the manifold base 1 in parallel with each other. On one end of the manifold base 1, an end plate 37 is fixed by screws 39 via gaskets 38, and the common supply path 26, the common discharge paths 28a and 28b, and the through hole 35 for wiring are air-tightly closed by the end plate 37, while on the other end of the manifold base 1, a terminal block 40 provided with a cable terminal 40a that connects the wiring to the outside is fixed by screws 42 via gaskets 41, the through hole 35 for wiring is air-tightly closed by the terminal block 40, and the ends of the common supply path 26 and the common discharge paths 28a and 28b are air-tightly closed.

The top cover 4 is of an integral type that covers the entire multiple valve 2 mounted on the manifold base 1 and is formed by a transparent or translucent synthetic resin, having a rectangular shape when viewed on plan, and a flashing state or the like of an operation indicator lamp of each electromagnetic valve 3 contained in the top cover 4 can be visually recognized from the outside. Since the top cover 4 is large-sized so as to cover the entire multiple valve 2 and is made of a synthetic resin, which is not sufficiently strong, strength that can withstand washing by high-temperature and high-pressure steam jet or the like should be given. Thus, the top cover 4 is reinforced by using the electromagnetic valve 3 firmly fixed to the manifold base 1 as will be described below.

That is, on lower ends of three peripheral walls 4d to 4f among four peripheral walls 4c to 4f of the top cover 4, a plurality of positioning pins 4a are projected in discrete arrangement, and by fitting and inserting the positioning pins 4a into small holes 44 disposed in the manifold base 1, the top cover 4 is positioned, and the top cover 4 is fixed by screws 45 screwed into screw holes 46 disposed in the manifold base 1 at plural spots including the four corners in that state.

The peripheral wall 4c located on the side of the electromagnetic operation portion 3a of each of the electromagnetic valves 3 which constitute the multiple valve 2 among the peripheral walls 4c to 4f of the top cover 4 is prevented from sliding and moving inward by contact with the end face on the electromagnetic operation portion 3a side of each of the electromagnetic valves 3, as will be described later, and is not positioned by the positioning pin 4a, but the positioning pin can be also provided as necessary on the peripheral wall 4c.

The top cover 4 has one or a plurality of reinforcing ribs 47 on the inner face of a top plate 4b thereof. The ribs 47 are in parallel with the peripheral walls 4e and 4f, and one ends of the ribs 47 reach the peripheral wall 4c, while the other ends reach the peripheral wall 4d. Each of the ribs 47 can be formed to such a height that the rib is brought into contact with the planar upper faces of the electromagnetic valves 3 mounted on the manifold base 1 all the time but can be also formed to such a height that the rib opposes the upper face with a slight gap. The slight gap is specifically such a gap that, when a pressing force acts on the top cover 4 from the outside in washing of the top cover 4 by using high-temperature and high-pressure steam jet (having specified values of 80° C., 8 to 10 MPa and the like), the ribs 47 are brought into contact with the upper faces of the electromagnetic valves 3 within a range where deformation of the top cover 4 caused by the pressing force is elastic deformation, and the top cover 4 can be disposed on the multiple valve 2 by forming each of the ribs 47 having a height so that such a positional relationship is formed.

Figure 5:
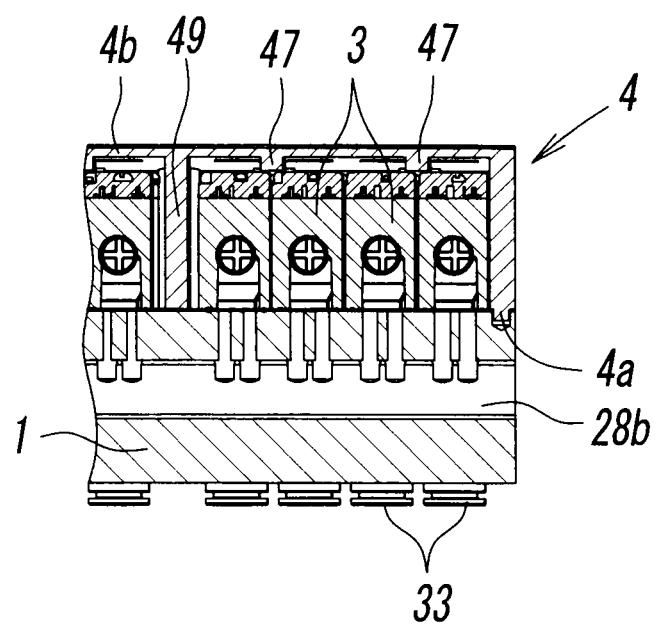
FIG. 5 is an enlarged sectional view of an essential part at V-V position in FIG. 3.

In the illustrated example, as clearly shown in FIG. 5, the ribs 47 are disposed at positions where the ribs are brought into contact with the upper faces of two of the adjacent electromagnetic valves 3 astride and four ribs 47 are disposed so as to be brought into contact with all the eight electromagnetic valves 3. That is, in FIG. 5, by arranging the ribs 47 at every other adjacent part where the electromagnetic valves 3 adjoin each other, only one rib 47 is brought into contact with one electromagnetic valve 3. However, the arrangement of the ribs 47 is not limited by such a configuration.

As described above, by configuring such that a part of the pressing force from the outside acting on the top plate 4b of the top cover 4 is received by the electromagnetic valves 3, the top plate 4b of the top cover 4 is reinforced by the electromagnetic valves 3, and the strength of the top cover 4 made of the synthetic resin can be increased without making the strength of the top cover 4 itself counteract the external force during washing and the like.

Also, the peripheral walls 4c and 4d of the top cover 4 have the strength thereof reinforced by contact with the end faces of the electromagnetic operation portions 3a in the electromagnetic valves 3 mounted on the manifold base 1 and/or the end face on the opposite side similarly to the top plate 4b. In the illustrated example, the end face on the side of the electromagnetic operation portion 3a of each of the electromagnetic valves 3 is arranged opposite to the inner face of one peripheral wall 4c of the top cover 4 as a reinforcing portion 3b that reinforces the peripheral wall 4c from the inside, peripheral wall ribs 48 for reinforcement are formed vertically along the peripheral wall 4c on a portion opposing the reinforcing portion 3b of the peripheral wall 4c, and by bringing the peripheral wall ribs 48 into contact with the reinforcing portion 3b of the electromagnetic valve 3 or by opposing the ribs against the reinforcing portion 3b through a slight gap, such a positional relationship is formed that the top cover 4 is brought into contact with the reinforcing portion 3b of the electromagnetic valve 3 within a range of elastic deformation by a pressing force onto the top cover 4 from the outside.

Each of the peripheral wall rib 48 is formed at a position corresponding to the end portion of the reinforcing rib 47 on the lower face of the top plate 4b and has a U-shaped section.

The electromagnetic valves 3 mounted on the manifold base 1 have two or three positions, and the length from the end face on the side of the electromagnetic operation portion 3a to the end face on the opposite side is different depending on the electromagnetic valve. Thus, there might be a case in which the peripheral wall cannot be reinforced by bringing the peripheral wall ribs 48 provided on the pair of opposing peripheral walls 4c and 4d of the top cover 4 into contact with the both end faces of the various electromagnetic valves 3. Thus, only if the electromagnetic valve 3 having the maximum length that can be used in this manifold valve is mounted on the manifold base 1, it is so configured that the peripheral walls 4c and 4d which oppose each other in the top cover 4 are brought into contact with the reinforcing portion 3b of the electromagnetic valve 3 for reinforcement. Thus, as described above, inward sliding movement of the peripheral wall 4c of the top cover 4 on the side of the electromagnetic operation portion 3a in each electromagnetic valve 3 is suppressed by the end of the electromagnetic operation portion 3a side, and the positioning by using the positioning pin 4a is not provided.

The peripheral wall ribs 48 are also disposed astride two of the adjacent electromagnetic valves 3, each being formed to have a U-shaped section, and two projecting rims 48a are individually brought into contact with the two electromagnetic valves. Also, since the peripheral wall ribs 48 are arranged at every other adjacent part of the adjacent electromagnetic valves 3 similarly to the reinforcing ribs 47, only one peripheral wall rib 48 is brought into contact with one electromagnetic valve 3, but other arrangements may be employed.

Also, in order to have larger strength in addition to the reinforcement of the top cover 4 by the ribs 47 and the peripheral wall ribs 48, as described above, the multiple valve 2 mounted on the manifold base 1 is divided into a plurality of groups, and the electromagnetic valves 3 are closely arranged in parallel in each group, but it is desirable that the gap 7 in which a reinforcing wall 49 provided on the lower face of the top plate 4b in the top cover 4 is disposed is formed between the groups, and the reinforcing wall 49 which is suspended into the gap 7 and positioned and fixed onto the manifold base 1 is integrally provided.

The reinforcing wall 49 is formed at an intermediate position of the top cover 4 so as to extend in parallel with the pair of opposing peripheral walls 4e and 4f and one end and the other end are integrally connected to one and the other of another pair of the peripheral walls 4c and 4d, and the height of the reinforcing wall 49 is the same as those of the peripheral walls 4c to 4f.

On the lower end of the reinforcing wall 49, a positioning pin 49a is projected as necessary, and the positioning pin 49a can be fitted and inserted into a small hole 50 (See FIG. 3) disposed in the manifold base 1.

REFERENCE SIGNS LIST

1 manifold base
2 multiple valves
3 electromagnetic valve
3a electromagnetic operation portion
4 top cover
4a positioning pin
4b top plate
4c, 4d peripheral wall
45 screw
44 small hole
47 rib
48 peripheral wall rib
49 reinforcing wall

The invention claimed is:

1. A multiple manifold valve comprising; a multiple valve mounted on a manifold base, and a top cover configured to cover the multiple valve in a sealed state, wherein the multiple valve comprises a plurality of electromagnetic valves; the top cover is integral and covers the entire multiple valve mounted on the manifold base and is comprises a transparent or translucent synthetic resin;

a plurality of positioning pins formed on the lower ends of peripheral walls of the top cover in a discrete state; the top cover being positioned by inserting the positioning pins into each of small holes in the manifold base; and the top cover being screwed into the manifold base at a plurality of spots including at least the four corners;

a reinforcing rib formed on an inner face of a top plate of the top cover, the rib being brought into contact with the upper faces of the electromagnetic valves mounted on the manifold base so as to extend along parallel end portions of two adjacent electromagnetic valves in a straddling state on one end portion and the other end portion of the parallel end portions or the rib being arranged so as to extend along parallel end portions of two adjacent electromagnetic valves and in a straddling state on one end portion and the other end portion of the parallel end portions in a state in which such a positional relationship is maintained that the rib is brought into contact with the electromagnetic valves within a range where the top cover is elastically deformed by a pressing force from the outside acting on the top cover; and only one rib is brought into contact with each pair of electromagnetic valves by arranging one rib for every other pair of adjacent electromagnetic valves.

2. The multiple manifold valve according to claim 1, wherein on at least one end face on the side of an electromagnetic operation portion of the electromagnetic valve mounted on the manifold base and an end face on the side opposite thereto, a reinforcing portion is formed that reinforces peripheral walls from the insides thereof against the inner faces of the peripheral walls of the top cover, a peripheral wall rib for reinforcement is formed on a portion of each of the peripheral walls opposing the reinforcing portion, the peripheral wall rib is brought into contact with the reinforcing portion of the electromagnetic valve or is formed so as to oppose the reinforcing portion in a state in which such a positional relationship is maintained that the rib is brought into contact with the reinforcing portion of each of the electromagnetic valves within a range where the top cover is elastically deformed by a pressing force from the outside acting on the top cover.

3. The multiple manifold valve according to claim 2, wherein the peripheral wall rib is disposed at a position astride and in contact with two of the adjacent electromagnetic valves.

4. The multiple manifold valve according to claim 3, wherein only one peripheral wall rib is brought into contact with each pair of electromagnetic valves by arranging the peripheral wall rib for every pair of adjacent electromagnetic valves.

5. The multiple manifold valve according to claim 3, wherein each of the peripheral wall rib has a U-shaped section and two projecting rims, and the two projecting rims are brought into contact with one and the other of the adjacent electromagnetic valves individually.

6. The multiple manifold valve according to claim 1, wherein the multiple valve mounted on the manifold base is divided into a plurality of groups, the electromagnetic valves are closely arranged in parallel in each group, a gap in which a reinforcing wall can intervene is formed between the groups; and on the inner face of the top cover, the reinforcing wall intervening in the gap between the groups and brought into contact with the manifold base is integrally provided.

7. The multiple manifold valve according to claim 2, wherein the multiple valve mounted on the manifold base is divided into a plurality of groups, the electromagnetic valves are closely arranged in parallel in each group, a gap in which a reinforcing wall can intervene is formed between the groups; and on the inner face of the top cover, the reinforcing wall intervening in the gap between the groups and brought into contact with the manifold base is integrally provided.

8. The multiple manifold valve according to claim 6, wherein the reinforcing wall is formed so as to extend across the inside of the top cover from one to the other of a pair of opposing peripheral walls, a positioning pin is formed on the lower end of the reinforcing wall, and by inserting the positioning pin into a small hole in the manifold base, the reinforcing wall is fixed onto the manifold base.

9. The multiple manifold valve according to claim 7, wherein the reinforcing wall is formed so as to extend across the inside of the top cover from one to the other of a pair of opposing peripheral walls, a positioning pin is formed on the lower end of the reinforcing wall, and by inserting the positioning pin into a small hole in the manifold base, the reinforcing wall is fixed onto the manifold base.

10. The multiple manifold valve according to claim 1, wherein said rib contacts said two adjacent electromagnetic valves at said end portions.

11. The multiple manifold valve according to claim 10, further comprising a number of said ribs and wherein each of said ribs contacts and straddles a respective pair of adjacent electromagnetic valves.

12. The multiple manifold valve according to claim 11, wherein said plurality of said electromagnetic valves includes a number of valves, said number of valves being twice said number of ribs, and wherein said number of ribs is in contact with said number of valves.

13. The multiple manifold valve according to claim 11, wherein each rib is in contact with only one pair of electromagnetic valves.

* * * * *